United States Patent
Chiappini et al.

(10) Patent No.: US 8,919,576 B2
(45) Date of Patent: Dec. 30, 2014

(54) SYSTEM FOR MOVING CRATES FOR STORING OBJECTS IN A WAREHOUSE

(75) Inventors: Andrea Chiappini, La Spezia (IT); Gianluca Biselli, La Spezia (IT)

(73) Assignee: OTO Melara S.p.A., La Spezia (IT)

( * ) Notice: Subject to any disclaimer, the term of this patent is extended or adjusted under 35 U.S.C. 154(b) by 855 days.

(21) Appl. No.: 13/100,029

(22) Filed: May 3, 2011

(65) Prior Publication Data

US 2011/0266241 A1  Nov. 3, 2011

(30) Foreign Application Priority Data

May 3, 2010  (IT) .............................. TO2010A0369

(51) Int. Cl.
*A47B 53/02* (2006.01)
*B61B 12/10* (2006.01)
*B65G 1/10* (2006.01)
*F41A 9/09* (2006.01)
*F41A 9/20* (2006.01)
*F41A 9/78* (2006.01)

(52) U.S. Cl.
CPC ... *B65G 1/10* (2013.01); *F41A 9/09* (2013.01); *F41A 9/20* (2013.01); *F41A 9/78* (2013.01)
USPC ..... 211/1.57; 312/201; 104/172.2; 104/172.1

(58) Field of Classification Search
CPC .... A47B 53/02; B65G 1/0407; B65G 1/0435; B65G 1/10; B65G 1/12; B65G 1/133; B61B 12/10; F41A 9/09; F41A 9/20; F41A 9/078
USPC ......... 211/1.57, 162; 212/312, 319, 320, 321, 212/322, 324, 326, 327, 332; 312/201, 301, 312/319.8, 349; 414/281, 282, 331.01, 414/331.03, 331.11, 331.13, 749.6, 751.1; 700/214, 218; 104/172.1, 172.2, 172.3
See application file for complete search history.

(56) References Cited

U.S. PATENT DOCUMENTS 2,772,639 A * 12/1956 Ingold .......................... 312/199
2,878,758 A * 3/1959 D Altrui ..................... 104/172.2
3,566,802 A * 3/1971 Lundgvist .................. 104/172.3

(Continued)

FOREIGN PATENT DOCUMENTS

| CH | 510 569 | 5/1969 |
| DE | 195 09 076 | 9/1996 |
| FR | 2 675 785 | 10/1992 |
| WO | WO 2009/038574 | 3/2009 |

OTHER PUBLICATIONS

Italian Search Report for Application No. IT TO20100369 dated Jan. 10, 2011.

*Primary Examiner* — Gregory Adams
*Assistant Examiner* — Brendan Tighe
(74) *Attorney, Agent, or Firm* — Merchant & Gould P.C.

(57) ABSTRACT

A system for moving crates in a warehouse, in which crates (C) to be moved are organized in supply modules (M), each made up of a predetermined number of rows each having a predetermined number of crates. The system includes a translator device (1) for rows of crates that brings about the movement of at least one row of crates, so as to create at least one aisle (W) for passing between one row and another of the module, in which it is possible to gain access through a crates manipulator (3), which is able to move along the module and through the aisles.

4 Claims, 4 Drawing Sheets

(56) References Cited

U.S. PATENT DOCUMENTS

| | | | |
|---|---|---|---|
| 3,693,552 A * | 9/1972 | Brown et al. | 104/172.2 |
| 3,762,335 A * | 10/1973 | Baker et al. | 104/173.1 |
| 4,790,247 A * | 12/1988 | Summa | 104/172.2 |
| 5,333,983 A | 8/1994 | Hatouchi et al. | |
| 5,505,574 A * | 4/1996 | Piazza | 414/267 |
| 5,549,050 A | 8/1996 | Rhodes | |
| 6,070,534 A * | 6/2000 | Lehrieder | 104/172.3 |
| 2007/0132344 A1 | 6/2007 | Kaneko | |

* cited by examiner

SYSTEM FOR MOVING CRATES FOR STORING OBJECTS IN A WAREHOUSE This application claims benefit of Serial No. TO 2010 A 000369, filed 3 May 2010 in Italy and which application is incorporated herein by reference. To the extent appropriate, a claim of priority is made to the above disclosed application.

BACKGROUND

The present invention refers to system for moving crates in a warehouse or store. In particular, the present invention refers to a system for moving crates for storing objects, preferably elongated objects, like for example projectiles housed inside their containers, arranged in a store, which must be made available to a firearms magazine. Such a magazine can be a magazine for firearms arranged on military vehicles, or else on fixed emplacements, whereas the crates with the projectiles are housed in a store, like a warehouse beneath the firearm, like for example the hold of a ship.

The system, in a preferred embodiment thereof, is adapted for moving such crates inside the stores.

In such technical solutions, the ammunition or projectile must be taken quickly from the hold of the ship, or in general from the ammunition store towards the magazine, which must always contain at least a sufficient predetermined number of projectiles. Therefore, in a warehouse or store, the arrangement of the full crates with respect to the empty ones and the ways of accessing the crates in the various positions become very important characteristics for the efficiency of the entire system.

In general, a very important parameter for the efficiency of an entire system for moving object contained in crates in a store is the speed with which such a system determines the availability of the object. From this point of view it also becomes important how quickly it is possible to access the crates that contain the objects themselves.

The solutions of the prior art do not foresee an efficient interaction between operator and automatic mechanisms for accessing the crates and for picking up the objects inside the crates themselves.

SUMMARY

The present invention proposes to solve such problems by proposing a system for moving crates organised in rows, in which objects are housed that are to be picked up and moved into predetermined positions of a store or warehouse, in which the crates can be moved row by row, so as to create aisles for passage between one row and another, into which it is possible to gain access to crates through a crates manipulator and to pick up objects, which is able to move along the store and through such aisles created.

In an embodiment of the invention, such objects are projectiles contained in crates packed in a store, which must be made available to a firearms magazine associated with such a store.

The crates are arranged in the store according to at least one supply module formed from a plurality of rows of crates.

An aspect of the present invention concerns a system for moving crates or cases in a warehouse or store.

BRIEF DESCRIPTION OF THE DRAWINGS

The characteristics and advantages of such a system will become clear from the following description of an embodiment with reference to the attached figures, which schematically illustrate.

DETAILED DESCRIPTION

Figure 1:
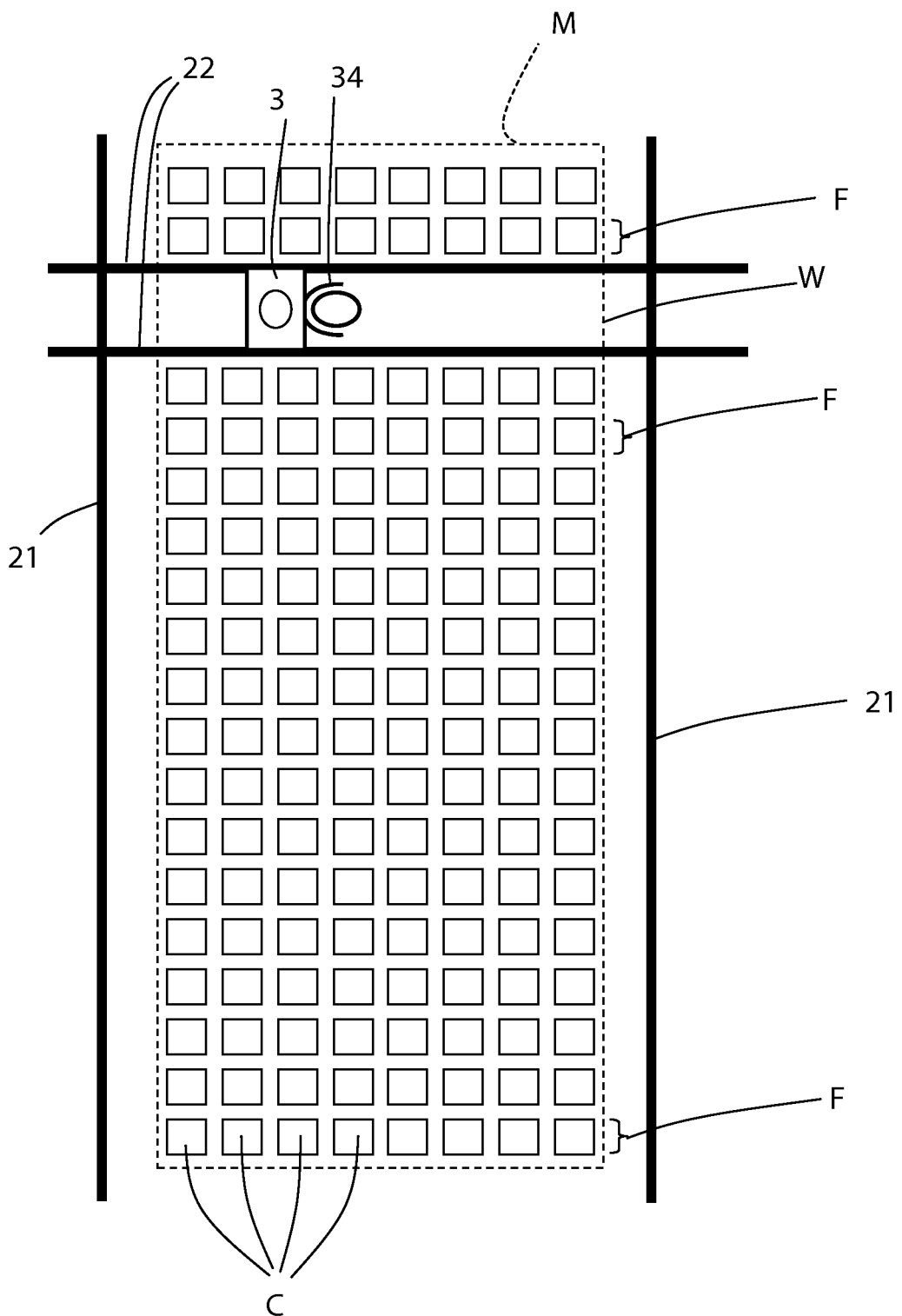
FIG. 1 a schematic view from above of the system for moving crates as a whole according to the present invention.
Figure 2:
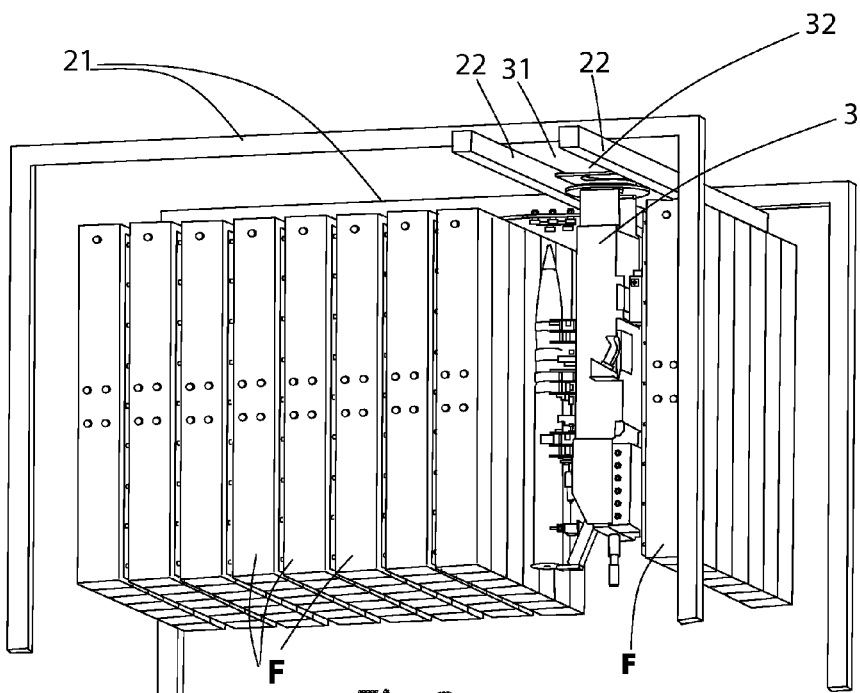
FIG. 2 the structure of the manipulator and of its movement mechanism according to the present invention.
Figure 5:
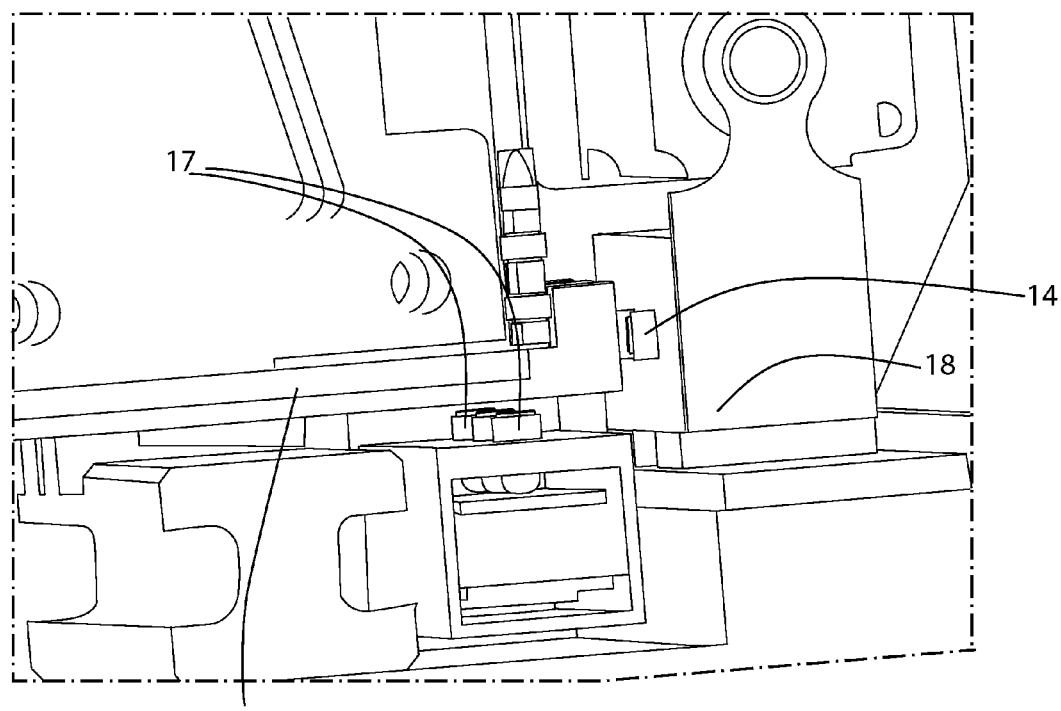
FIGS. 4 and 5 illustrate in details the translator of FIG. 3.
Figure 3:
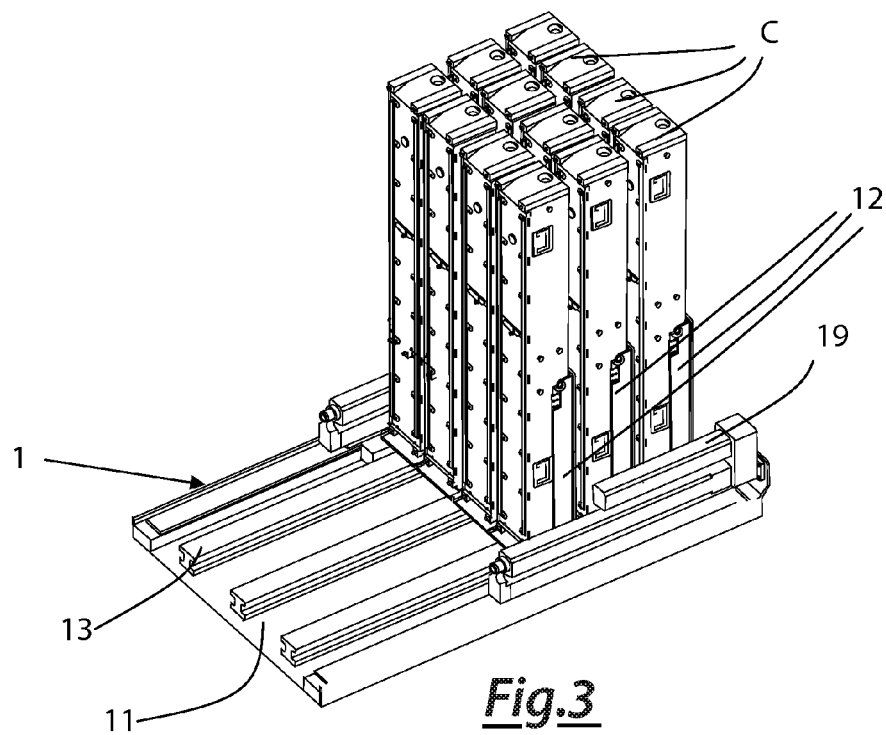
FIG. 3 the structure of the translator device for rows of crates in a perspective view according to the present invention.
Figure 4:
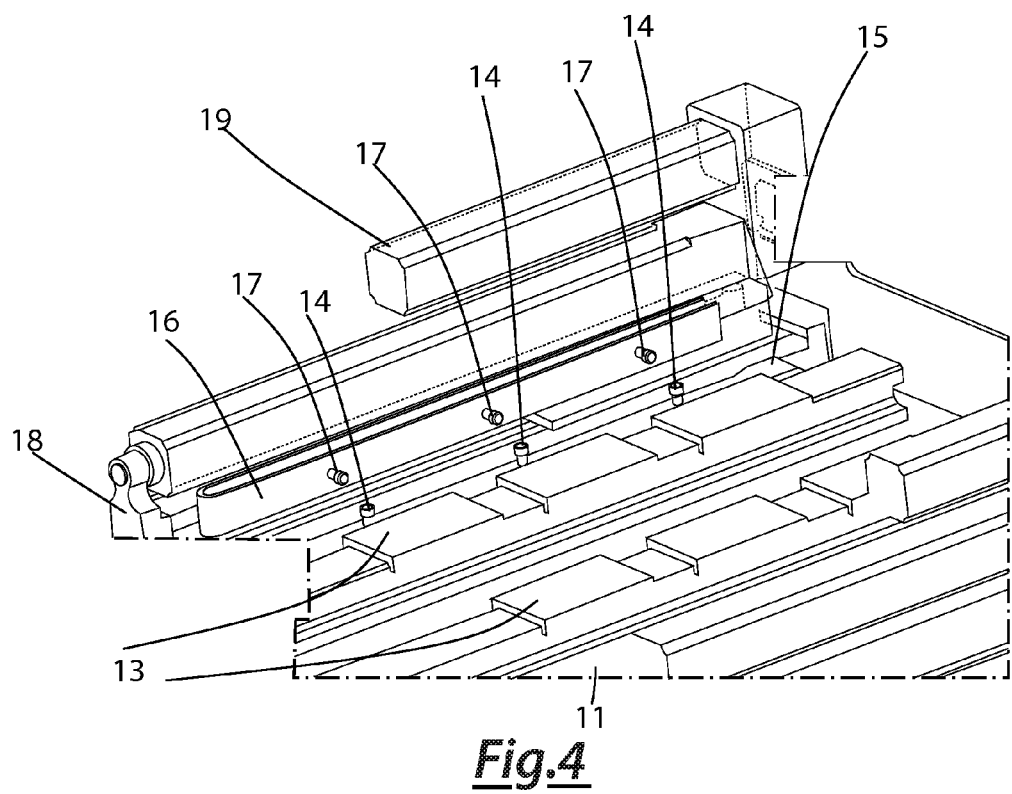

With reference to the quoted figures the system for moving crates is applied to a store or warehouse in which crates C to be moved, in which objects to be picked up are housed, are organised in supply modules M. Each module is made up of a predetermined number of rows F of crates, each having a predetermined number of crates.

According to the present invention the system comprises a translator device 1 for rows of crates, which determines the movement of such rows so as to create aisles W for passing between one row and another, in which it is possible to gain access through a crates manipulator 2 and possibly to pick up objects, which is able to move along the store and through such aisles through an overhead-travelling-crane mechanism 3.

In an embodiment of the present invention, such objects are bullets contained in crates stuffed in a bullet store, which need to be provided to a firearm magazine.

Manipulator 2 is adapted to pick crates C up, grip and orientate the objects contained therein and is associated to overhead-travelling-crane mechanism 3, which transports it along quoted supply module M.

The manipulator can be automatically controlled by an operator through an electronic processing unit associated with it.

The firearm is usually arranged above the store or warehouse, for example this occurs in the hold of a ship.

But more generally, the system according to the present invention could be used, with suitable modifications, in any field in which it is necessary to move particular objects.

The overhead-travelling-crane mechanism essentially comprises at least one pair of longitudinal guides 21, on which at least one pair of transverse guides 22 slide, on which manipulator 3 in turn slides. The longitudinal guides have at least one longitudinal motor associated with them, adapted for moving the transverse guides along longitudinal axis X of the guides.

Transverse guides 22 have at least one transverse motor associated with them, adapted for moving the manipulator along transverse axis Y of the guides. The manipulator comprises a sliding plate 31, which proceeds on the transverse guides and an elongated body, fixedly connected to sliding plate 31 through a circular joint 32, which allows the rotation of the manipulator about vertical axis z, for its correct orientation.

The manipulator also comprises means for gripping an object, comprising a plurality of grippers 34.

The manipulator is also provided with a pair of mobile forks 38 with which such crates C are picked up.

Translator device 1 for rows of crates comprises a base 11 that represents the bearing structure of each module M, a plurality of frames 12 each adapted for housing and supporting a row of crates. Each frame can slide longitudinally on the quoted base and in particular on longitudinal guides 13 placed on the base itself. Means for moving such frames on the base determine the movement of the rows of crates, so as to form at least one aisle W between two adjacent rows in which manipulator 2 can be moved.

Such movement means comprise fixed linear chain guides 14, constrained to base 11 and a plurality of vertical retractile coupling elements 15, which, when they are inserted at the bottom in purposely provided housings of various frames 12, block them on the base and prevent movement thereof. The movement of such couplings is obtained through the interaction with cams present on such a chain, which move with it and which bring about displacement thereof upwards, whilst elastic means, for example a spring, bring about the return thereof back towards the outside of the frame, when they no longer encounter the cam.

Such movement means further comprise mobile linear chain guides 16, which rotate along the two sides of the module and retractable side couplings 17, that when inserted from the side into dedicated housings of various frames 12, make them fixedly connected to chain 16. The movement of such side couplings is obtained through the interaction with cams provided on such a mobile chain, that move together with it and provoke the displacement of such couplings toward the inside of the module and hence towards the frames, whereas elastic means, for example a spring, provoke the back stroke towards the outside of the frame, when they no longer encounter the cam.

The mobile chains are constrained to a support 18 that slides along lateral guides of the module, actuated by a linear motor 19, until the engaged frame is brought into the desired position to create the aforementioned aisle.

Figure 6:
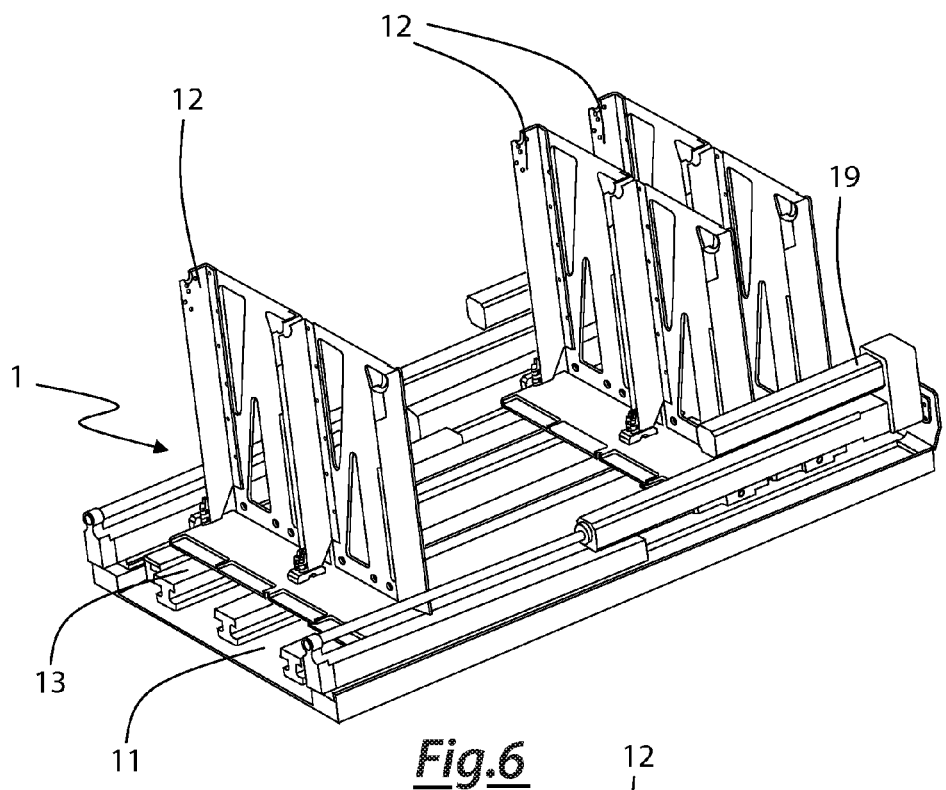
FIG. 6 the translator of crates in a first operating condition.
Figure 7:
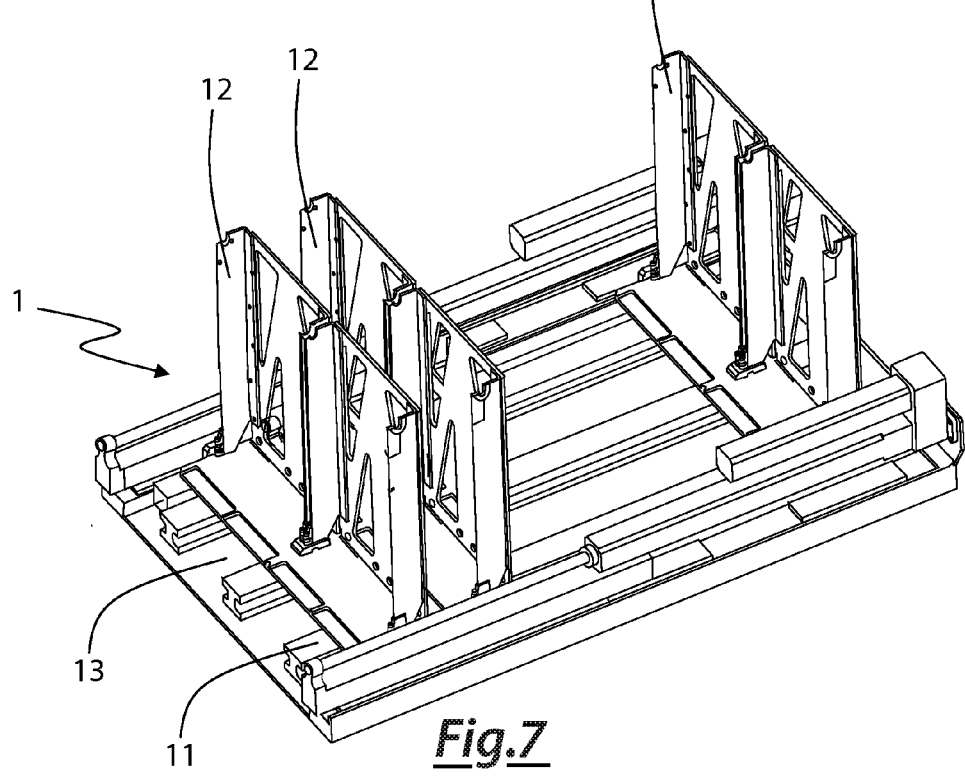
FIG. 7 the translator of crates in a second operating condition.

In the example of FIGS. 6 and 7, a module is illustrated made up of three rows of crates. Therefore, on the base there will be three series of vertical couplings (one series per row) and on both of the sides of the modules there will be at least three lateral couplings, one for each row associated with the mobile chain.

All of the movements of the system, thus movements along axis X and Y of the overhead-travelling-crane mechanism, rotation movements about the longitudinal axis of the manipulator, movements along the vertical axis of the manipulator, opening and closing of grippers 34, movement of forks 38, movements of the crates translator device, in particular of the linear motors, are controlled electronically by a processing unit in an automatic fashion, through the remote control of an operator who interfaces with such a processing unit, for example through a personal computer. The system also foresees a semi-automatic mode in which the manipulator has an access interface for the operator comprising a control stick, provided with control buttons and possibly a display, which can also be provided with control buttons. In this way, the operator can directly bring about and follow the movements and the operations of the manipulator inside the store.

The invention claimed is:

1. System for moving crates in a warehouse in a hold of a ship, wherein the crates to be moved are organized in supply modules, each module made up of a predetermined number of rows, each having a predetermined number of crates, the system comprising:
   at least one translator device for rows of crates, the translator device bringing about displacement of at least one row of crates to create at least one aisle for passage between one row and another now of said module, crates are accessible via a crate manipulator, the manipulator being movable along the module and along said aisles;
   said translator device comprising:
   a base, said base representing a load-bearing structure of each module;
   a plurality of frames, each frame being configured for housing and supporting a row of crates; said plurality of frames being longitudinally slidable on said base perpendicularly to a row;
   means for moving said frames on said base, said means for moving bringing about movement of the rows of crates to form said at least one aisle between two adjacent rows; said means for moving comprising:
   fixed first linear chain guides guiding a mobile chain and being constrained to the base, the first linear chain guides including cams;
   a plurality of vertical retractable coupling elements, said plurality of vertical retractable coupling elements; wherein then the vertical coupling elements are inserted at a bottom of dedicated housings of the plurality of frames, the vertical coupling elements block the housings on the base and prevent movement of the housings; and wherein movement of said retractable coupling elements occurs by interacting with the cams on said first linear chain guides, said cams moving with the first linear chain guides and moving the couplings upward while elastic devices move said couplings downward when the couplings disengage the cams.

2. System according to claim 1, wherein said means for moving said frames comprise mobile second linear chain guides, which rotate along two sides of the module and retractile side couplings, which, when inserted laterally in purposely provided housings of the various frames, render the couplings fixed with respect to the mobile chain.

3. System according to claim 2, wherein the movement of said side couplings is obtained via interaction with cams on a second mobile chain, said cams move along with the second mobile claim and bring about displacement of said couplings towards the inside of the module and towards the frames, wherein elastic means bring about return of said couplings backwards towards the outside of the frame, when said couplings no longer encounter the cam.

4. System according to claim 2, wherein the mobile chains are constrained to a support, the support sliding along lateral guides of the module and driven by a linear motor, until the engaged frame is brought into the desired position to create the aisle.

* * * * *